United States Patent
Strobel et al.

(10) Patent No.: US 7,113,300 B2
(45) Date of Patent: Sep. 26, 2006

(54) METHOD AND SYSTEM FOR SECURE DELIVERY AND PRINTING OF DOCUMENTS

(75) Inventors: Kevin L. Strobel, Fairfield, CT (US); James R. Norris, Jr., Danbury, CT (US); John W. Rojas, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 678 days.

(21) Appl. No.: 09/904,344

(22) Filed: Jul. 12, 2001

(65) Prior Publication Data

US 2003/0011810 A1    Jan. 16, 2003

(51) Int. Cl.
*G06K 15/00* (2006.01)
*G06F 15/00* (2006.01)

(52) U.S. Cl. ............. 358/1.15; 358/403; 358/500; 358/400; 380/278; 380/279

(58) Field of Classification Search ......... 358/1.15, 358/500, 400, 403; 709/216, 217, 219; 380/243, 255, 278, 279, 277
See application file for complete search history.

(56) References Cited

U.S. PATENT DOCUMENTS

| | | | |
|---|---|---|---|
| 5,068,888 A | 11/1991 | Scherk et al. ........ | 379/100.11 |
| 5,168,444 A | 12/1992 | Cukor et al. ........ | 705/1 |
| 5,283,871 A | 2/1994 | Kobayashi ........ | 709/227 |
| 5,327,486 A | 7/1994 | Wolff et al. ........ | 379/93.23 |
| 5,459,458 A | 10/1995 | Richardson et al. ... | 340/825.52 |
| 5,513,126 A | 4/1996 | Harkins et al. ........ | 709/228 |
| 5,633,932 A | 5/1997 | Davis et al. ........ | 713/176 |
| 5,675,507 A | 10/1997 | Bobo, II ........ | 709/206 |
| 5,692,048 A | 11/1997 | Gormish et al. ........ | 380/246 |
| 5,742,905 A | 4/1998 | Pepe et al. ........ | 455/461 |
| 5,787,149 A | 7/1998 | Yousefi et al. ........ | 455/422.1 |
| 5,790,790 A | 8/1998 | Smith et al. ........ | 709/206 |
| 5,802,460 A | 9/1998 | Parvulescu et al. ........ | 455/92 |
| 5,832,221 A | 11/1998 | Jones ........ | 709/206 |
| 5,873,077 A | 2/1999 | Kanoh et al. ........ | 707/3 |
| 5,966,663 A | 10/1999 | Gleason ........ | 455/466 |
| 5,983,073 A | 11/1999 | Ditzik ........ | 455/11.1 |

(Continued)

FOREIGN PATENT DOCUMENTS

EP    0821507    1/1998

(Continued)

OTHER PUBLICATIONS

American Heritage Dictionary of the English, Houghton Mifflin Company, 3rd edition.*

(Continued)

*Primary Examiner*—King Y. Poon
(74) *Attorney, Agent, or Firm*—Brian A. Lem; Angelo N. Chaclas

(57) ABSTRACT

A system and method for providing secure, on-demand printing of documents delivered to a printing device is disclosed. A user logs onto a delivery system using a mobile device and selects a document to be printed along with a destination printing device. The delivery system encrypts the document to be delivered and creates a key that is sent to the mobile device. The delivery system sends the encrypted document to the destination printing device where it is stored. When the user is physically at the destination printing device, a connection is established between the mobile device and the destination printing device. The mobile device identifies to the printing device the document to be printed and sends the key to the printing device. The printing device uses the key to decrypt the document and then prints the document.

54 Claims, 6 Drawing Sheets

U.S. PATENT DOCUMENTS

| | | | | |
|---|---|---|---|---|
| 6,002,752 | A | 12/1999 | Park | 379/100.15 |
| 6,006,087 | A | 12/1999 | Amin | 455/413 |
| 6,008,727 | A | 12/1999 | Want et al. | 340/572.1 |
| 6,008,921 | A | 12/1999 | Brusky et al. | 398/106 |
| 6,061,448 | A * | 5/2000 | Smith et al. | 380/282 |
| 6,072,862 | A | 6/2000 | Srinivasan | 379/100.08 |
| 6,119,137 | A | 9/2000 | Smith et al. | 715/523 |
| 6,134,433 | A | 10/2000 | Joong et al. | 455/417 |
| 6,169,805 | B1 | 1/2001 | Dunn et al. | 380/277 |
| 6,184,996 | B1 | 2/2001 | Gase | 358/1.15 |
| 6,212,550 | B1 | 4/2001 | Segur | 709/206 |
| 6,216,158 | B1 | 4/2001 | Luo et al. | 709/217 |
| 6,233,684 | B1 | 5/2001 | Stefik et al. | 713/176 |
| 6,240,183 | B1 | 5/2001 | Marchant | 380/28 |
| 6,256,378 | B1 | 7/2001 | Iggulden et al. | 379/102.03 |
| 6,272,530 | B1 | 8/2001 | Horiuchi et al. | 709/206 |
| 6,289,212 | B1 | 9/2001 | Stein et al. | 455/412.1 |
| 6,289,389 | B1 | 9/2001 | Kikinis | 709/239 |
| 6,297,891 | B1 | 10/2001 | Kara | 358/405 |
| 6,314,454 | B1 | 11/2001 | Wang et al. | 709/206 |
| 6,378,070 | B1 | 4/2002 | Chan et al. | 713/155 |
| 6,389,115 | B1 | 5/2002 | Swistock | 379/88.12 |
| 6,430,601 | B1 | 8/2002 | Eldridge et al. | 709/206 |
| 6,460,073 | B1 | 10/2002 | Asakura | 709/206 |
| 6,493,696 | B1 | 12/2002 | Chazin | 706/47 |
| 6,553,240 | B1 | 4/2003 | Dervarics | 455/566 |
| 6,587,871 | B1 | 7/2003 | Schrader | 709/206 |
| 6,591,367 | B1 | 7/2003 | Kobata et al. | 726/31 |
| 6,594,349 | B1 | 7/2003 | Fortman | 379/88.14 |
| 6,662,052 | B1 * | 12/2003 | Sarwal et al. | 607/59 |
| 6,674,453 | B1 | 1/2004 | Schilit et al. | 715/810 |
| 6,819,917 | B1 | 11/2004 | Yamauchi | 445/411 |
| 2001/0037462 | A1 | 11/2001 | Bengtson | 72/169 |
| 2002/0191210 | A1 | 12/2002 | Staas et al. | 358/1.15 |
| 2003/0005330 | A1 | 1/2003 | Berkema et al. | 726/4 |

FOREIGN PATENT DOCUMENTS

| | | |
|---|---|---|
| EP | 1045574 A1 | 10/2000 |
| EP | 1091536 | 4/2001 |
| EP | 1146684 | 10/2001 |
| WO | 00/79732 | 12/2000 |

OTHER PUBLICATIONS

Specification of U.S. Appl. No. 09/707,561, titled "Method and System for Remote Retrieval of Documents," filed Nov. 7, 2000.

Specification of U.S. Appl. No. 09/727,893, titled "Method and System for Remote Retrieval of Messages Using Spontaneous Networking Technology," filed Nov. 30, 2000.

Specification of U.S. Appl. No. 09/728,237, titled "Method and System for Remote Printing of Documents," filed Nov. 30, 2000.

Specification of U.S. Patent Application titled "Method and System for Secure Delivery and Printing of Documents Via A Networked Device," filed contemporaneously herewith.

Specification of U.S. Patent Application titled "Method and System for Secure Delivery and Retrieval of Documents Utilizing A Facsimile Machine," filed contemporaneously herewith.

Omatseye, Sam, "vVault Enhances Productivity for Mobile Professionals," RCR Wireless News (www.rcrnews.com), Mar. 5, 2001.

vVault, Powering Mobile Productivity; www.vvault.com, downloaded Jul. 9, 2001.

* cited by examiner

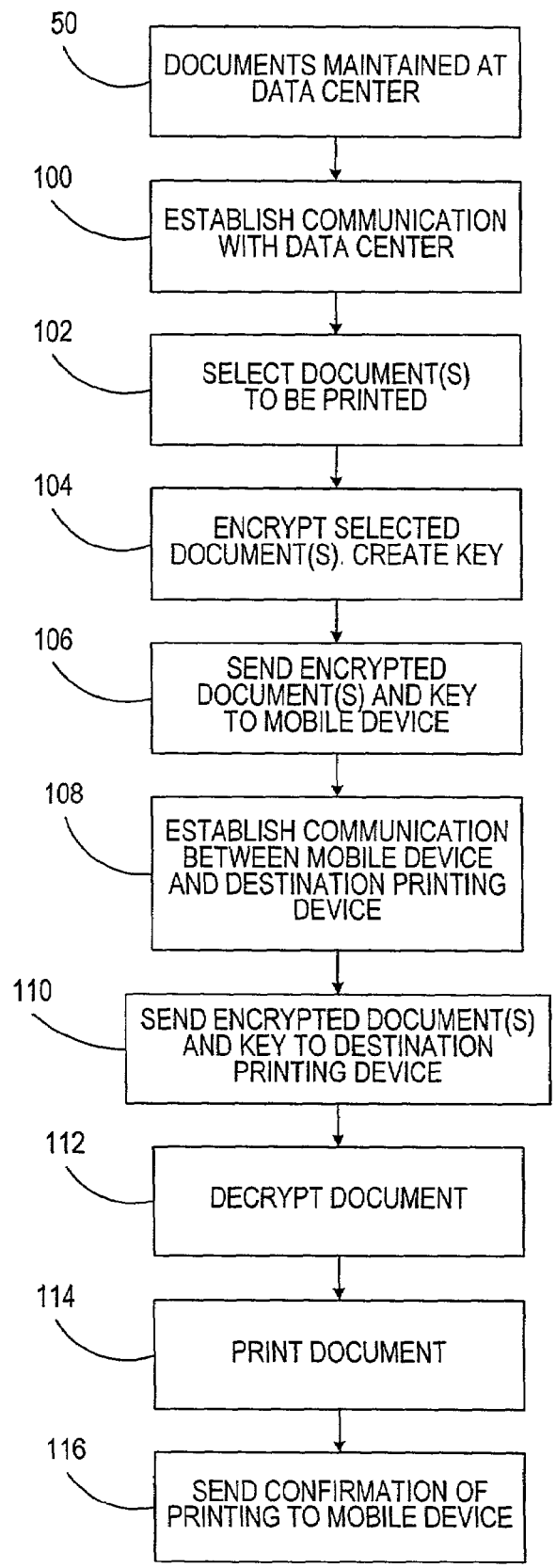

METHOD AND SYSTEM FOR SECURE DELIVERY AND PRINTING OF DOCUMENTS

FIELD OF THE INVENTION

The invention disclosed herein relates generally to messaging technology, and more particularly to a system and method for providing secure, on-demand printing of documents delivered to a printing device.

RELATED APPLICATIONS

This application is related to U.S. applications Ser. No. 09/707,561, filed Nov. 7, 2000, now U.S. Pat. No. 6,801,932; Ser. No. 09/727,893, filed Nov. 30, 2000, now U.S. Pat. No. 6,654,601; Ser No. 09/728,237, filed Nov. 30, 2000, now U.S. Pat. No. 6,744,528; Ser. No. 09/904,395, filed Jul. 12, 2001; and Ser. No. 09/904,341, filed Jul. 12, 2001, now U.S. Pat. No. 6,751,732; each assigned to the assignee of the present invention.

BACKGROUND OF THE INVENTION

In today's rapidly paced society, professional and personal demands on messaging technologies, such as voice mail, e-mail, facsimile and pagers, have greatly increased. The development of this technology, in turn, has increased demands on mobile people who rely on these messaging devices for a variety of business and social communications. Specifically, these expectations have forced the mobile professional to demand the ability to receive messages regardless of time, location, or availability of messaging devices. According to a recent study by Pitney Bowes Inc. of Stamford, Conn., a typical business professional receives 169 messages a day. Many of these messages are delivered using some form of electronic and mobile communication such as cellular telephones, facsimiles, analog/digital telephone, pagers, e-mail transmission, and personal data assistants. These messages help determine the mobile professional's daily plans, keep him/her in contact with his/her community and enable him/her to accomplish his/her professional and personal goals.

Users, recognizing the capabilities of these devices, have relied on these devices such that they have become nearly indispensable tools for many businesses and individual consumers. Specifically recognized as invaluable are the inherent capabilities of a facsimile as an effective means of quickly and efficiently transmitting many types of documents from one known and specified location to another known and specified location. Facsimile machines are indispensable global tools, because they are used throughout the world and are accessible by and compatible with any other facsimile in the world. In addition, the use of facsimile machines has significantly improved the speed of transmittal of documents as compared to the sending of such a document through the postal services and/or various other express courier services, which, in general, require overnight delivery. Furthermore, facsimile machines have eased the travel burden on mobile professionals by eliminating the total number of printed documents they must carry to offsite meetings. With the aid of facsimile machines, any forgotten necessary documents may be retrieved by a simple facsimile.

In another messaging scenario, an individual may desire to print a hard copy of a document, an e-mail message or attachments to an e-mail message. In typical document messaging systems, a user desiring to print a document or message must be physically connected to a local printer or networked to a shared printer to print the document or message.

There are problems, however, with conventional document messaging systems. For example, a person desiring to print a document or message, or receive a facsimile of a document or message, must know the location of the device, and in the case of a facsimile, the facsimile number where a message may be received. If the message is a confidential communication, the user will desire to be present at the precise time the document or message is printed to claim the printed document or message before others see it. Otherwise, if the receiving facsimile machine or printer is in a public location, there is a risk that the message will be printed and left in an accessible location before the intended recipient gets there. Thus, if the intended recipient is not physically present at the facsimile machine or printer when the printing occurs, the intended recipient may never receive the message, and/or any confidentiality may be broken.

Similarly, if a shared network printer is being used to print a document or a message, there is a risk that the document or message will be printed and left in an accessible location before the user gets there to retrieve the printed document or message. Accordingly, any confidentiality may not be maintained.

Thus, there exists a need for a messaging system that can provide secure, on-demand printing of documents or messages delivered to a printing device, thereby ensuring receipt by the intended recipient and ensuring confidentiality of the contents of the document or message.

SUMMARY OF THE INVENTION

The present invention alleviates the problems associated with the prior art and provides secure, on-demand printing of documents, messages and the like delivered to a printing device, such as, for example, a facsimile machine, printer or copier.

In accordance with the present invention, a user logs onto a document delivery system using a mobile device and selects a document, message or the like stored on a server to be printed along with a destination printing device for performing the printing. The document server encrypts the document to be delivered to the printing destination and creates a key. The key is sent to the mobile device. The document server sends the document to the destination printing device which stores the encrypted document. When the user is physically at the destination printing device, a connection is established between the mobile device and the destination printing device. The mobile device identifies to the printing device the document to be printed and sends the key to the printing device. The printing device uses the key to decrypt the document and then prints the document. Accordingly, the document will not be printed until the user is present at the printing device to retrieve the document as soon as it is printed.

According to another aspect of the present invention, if the document is not printed at the destination printing device within a predetermined period of time, it will be deleted from the destination printing device.

According to another aspect of the present invention, a selected document is encrypted and sent from the document server to the mobile device along with the key. When the user is physically at the destination printing device, a connection is established between the mobile device and the destination printing device, and the encrypted document and key are sent from the mobile device to the destination printing device. The printing device uses the key to decrypt the document and then prints the document. Accordingly, the document will not be printed until the user is present at the printing device to retrieve the document as soon as it is printed.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 3 illustrates in flow diagram form a process flow of the messaging system according to another embodiment of the present invention.

DETAILED DESCRIPTION OF THE PRESENT INVENTION

Figure 1:
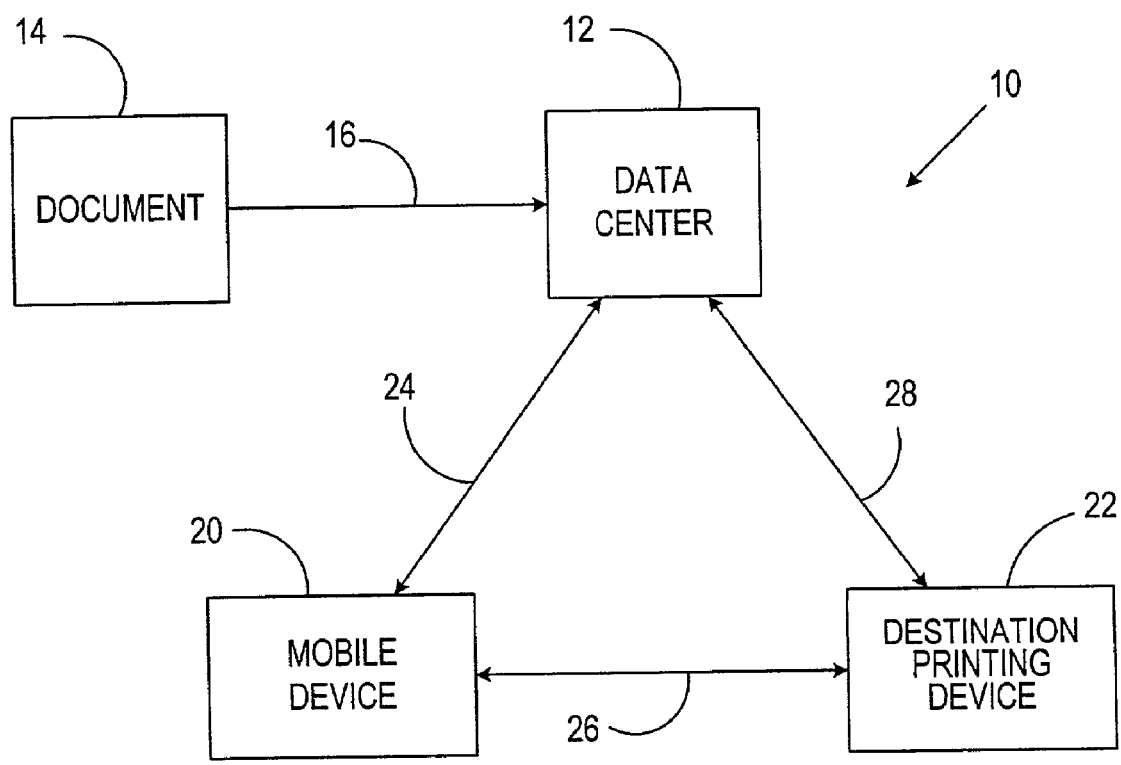
FIG. 1 is a block diagram of a messaging system according to the present invention.

In describing the present invention, reference is made to the drawings, wherein there is seen in FIG. 1 a system 10 for secure delivery and printing of documents according to the present invention. The term document, as used herein, refers to any type of document, message (e-mail, voicemail, textual, or any other message format), attachment to a message, or the like that is already in or may be converted to electronic form and electronically transmitted. The system 10 includes a data center 12 that provides a document repository for a plurality of users. Thus, for example, a document 14 intended for a specified recipient is sent to data center 12 via communication link 16 and stored in data center 12. Each registered user of data center 12 is provided with a designated location for storage of documents intended for that user, such as, for example, a dedicated "In Box" similar to that found on conventional e-mail systems. While FIG. 1 illustrates document 14 being sent directly to data center 12, it should be understood the document 14 may first be sent to a specified recipient's default destination, such as, for example, an e-mail address, facsimile machine, or voice system, which then routes the document to data center 12.

System 10 also includes one or more mobile devices, such as mobile device 20, associated with each registered user of the system 10. Mobile device 20 may be a personal data assistant (PDA), pager, cell phone, laptop computer, or any other mobile wireless device typically carried by a user. Mobile device 20 is used to log into the data center 12 via a communication link 24 to determine if any documents 14 are presently stored in that user's in-box and to retrieve any stored documents as will be described below. Communication link 24 is preferably a wireless communication. Alternatively, data center 12, after receiving a new document 14, can identify the intended recipient and send a notification of receipt of document 14 to the recipient via any one of the mobile devices associated with the user, such as, for example, mobile device 20. Accordingly, a user will be notified upon receipt of a new document 14 and will not have to log into the data center 12 to determine if any new documents have been received and stored by the data center 12.

If a user wishes to print a document 14 stored in data center 20, the user selects an available destination printing device 22. Printing device 22 may be, for example, a facsimile machine, printer, photocopier or the like. The user establishes a communication link 26 between the mobile device 20 and printing device 22 for the exchange of information necessary for mobile device 20 to initiate the process of printing a document 14 using printing device 22. Communication link 26 can be either a wired link or a wireless link, such as, for example, an infrared or radio frequency link. A wireless link can utilize ad-hoc, spontaneous networking technology such as, for example, Bluetooth or IEEE 802.11. Alternatively, a wireless link could also be a manual link, i.e., information can simply be input by the user directly to the mobile device 20 via a keypad or the like. Such information may include, for example, an address of the destination printing device 22, the telephone number of the printing device 22, and the types of encryption that the printing device 22 supports. Alternatively, the address or telephone number of previously used devices and types of encryption supported can be stored in mobile device 20 or data center 12 and retrieved from mobile device 20 by the user.

Once the mobile device 20 has the information necessary for initiating a print of a document 14, either by obtaining the information directly from printing device 22, manually inputting the information into mobile device 20, or recalling the information from a memory in mobile device 20 or data center 12, mobile device 20 will log into the data center 12 via communication link 24 and transmit the printing device 22 information to the data center 12. The user then selects a document 14 or group of documents he desires to retrieve and have printed. For example, a user may request two e-mail messages and one or more attachments to one of the e-mail messages to be printed, or an e-mail message and a text document. Data center 12 will encrypt the document(s) 14 and create a key for decrypting the document(s) 14. Any well known data encryption and decryption techniques may be used, such as those which use public and private key management. Optionally, data center 12 can establish a communication link 28 with the printing device 22 to interrogate printing device 22 as to the types of encryption supported by printing device 22 if this information is not known. The encrypted document(s) 14 are then sent from data center 12 to the destination printing device 22 via communication link 28 in accordance with the information provided by mobile device 20. The key created by data center 12 is sent to mobile device 20 via communication link 24, along with an identifier to identify the document(s) 14 as described below.

Printing device 22 will store the encrypted document(s) 14 upon receipt from data center 12. When the user is present at printing device 22, communication link 26 is established (if not previously established or re-established if the previous communication has been disrupted) between mobile device 20 and printing device 22. Communication link 26 can either be initiated by the user via mobile device 20 or be initiated spontaneously when mobile device 20 and printing device 22 are within a certain range of each other. Mobile device 20 identifies the desired document(s) 14 to be printed to printing device 22 and passes the associated key created by data center 12 to printing device 22 via communication link 26. Alternatively, as noted above, communication link 26 could be a wireless manual link, i.e., the identification of the desired document(s) 14 associated key could be manually input to printing device 22 via a keyboard or the like. The document(s) 14 to be printed can be identified by a header attached to the encrypted document(s) 14, by an extension attached to the encrypted document(s) 14, or any other manner as is known in the art. Printing device 22, upon receipt of the document(s) 14 identifier and associated key, will decrypt the document(s) 14 using the associated key and print the decrypted document(s) 14. Alternatively, once the printing device 22 has decrypted the document(s) 14, instead of automatically printing the document(s) 14 when the communication link 26 is established and the document(s) 14 identifier and key are transmitted, printing of the document(s) 14 could be under control of the user via a menu selection or the like displayed on a user interface of mobile device 20 or on the printing device 22.

Thus, according to the present invention, the printing of the document(s) 14 is not performed until the intended recipient is actually present at the printing device 22, thereby ensuring security of the contents of the document(s) 14 and receipt only by the intended recipient. A user can therefore schedule a delivery of the document(s) 14 to the printing device 22 and does not need to remain at the location of printing device 22 until the delivery and printing has been completed. Instead, the user can return at a later, more convenient time and complete the printing of the document (s) 14, without compromising the confidentiality of the document(s) 14.

As an added security feature, once the document(s) 14 have been printed, printing device 22 can optionally notify the data center 12 that printing has occurred and data center 12 can then notify mobile device 20 or any one of the other mobile devices associated with the user. Mobile device 20 can then provide an alert to the user that the document(s) 14 have been printed. Alternatively, printing device 22 can directly notify mobile device 20 or any one or more of the mobile devices associated with the user that printing has been completed.

Furthermore, if the destination printing device 22 does not receive the document(s) 14 identifier and associated key within a predetermined time period s after receipt of the encrypted document(s) 14, the printing device 22 can remove the encrypted document(s) 14 from its memory, thereby increasing security of the document(s) 14 by preventing any unauthorized party from retrieving the document(s) 14 and attempting to decrypt and print them.

Figure 2A:
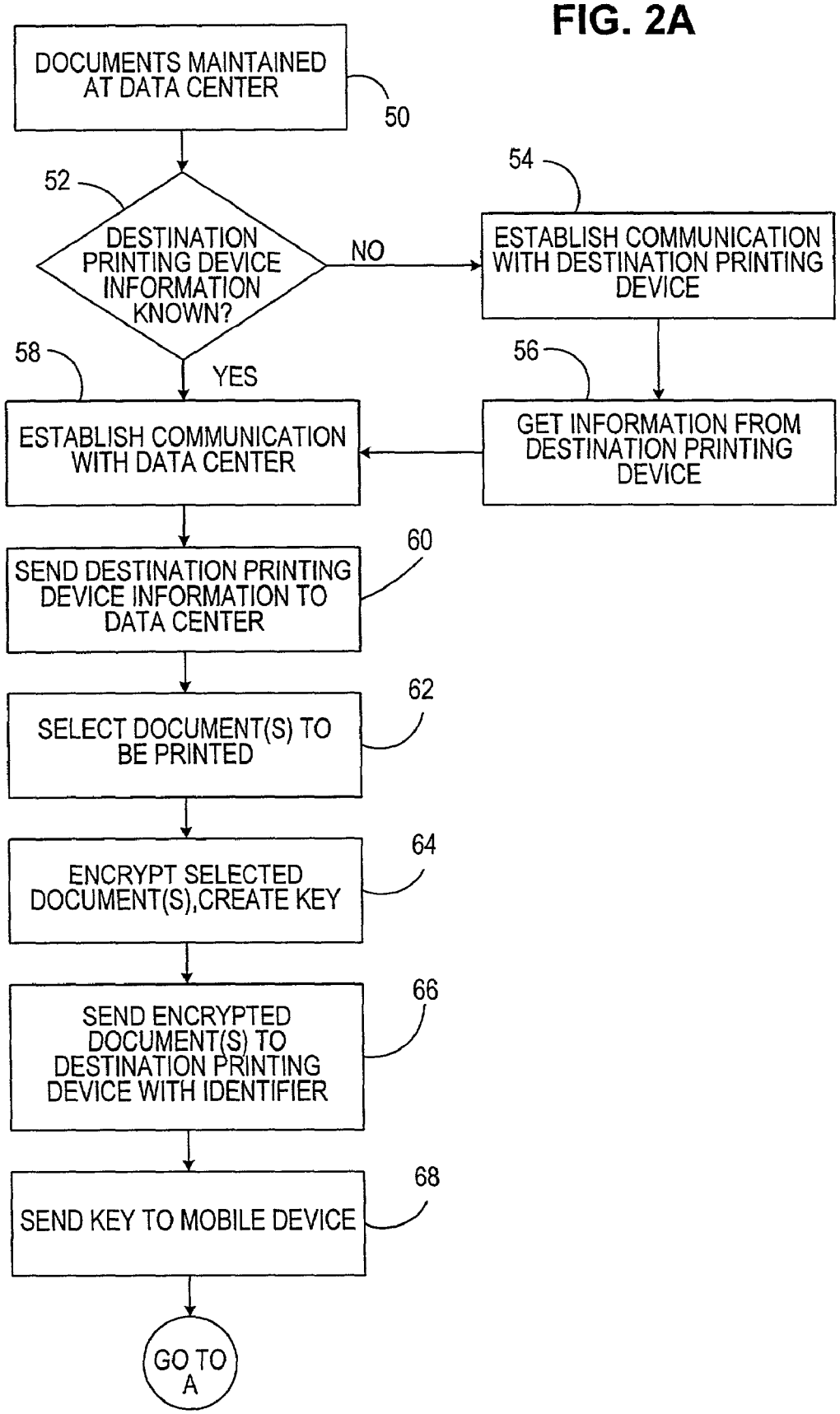
FIGS. 2A and 2B illustrate in flow diagram form a process flow of the messaging system according to an embodiment of the present invention.
Figure 2B:
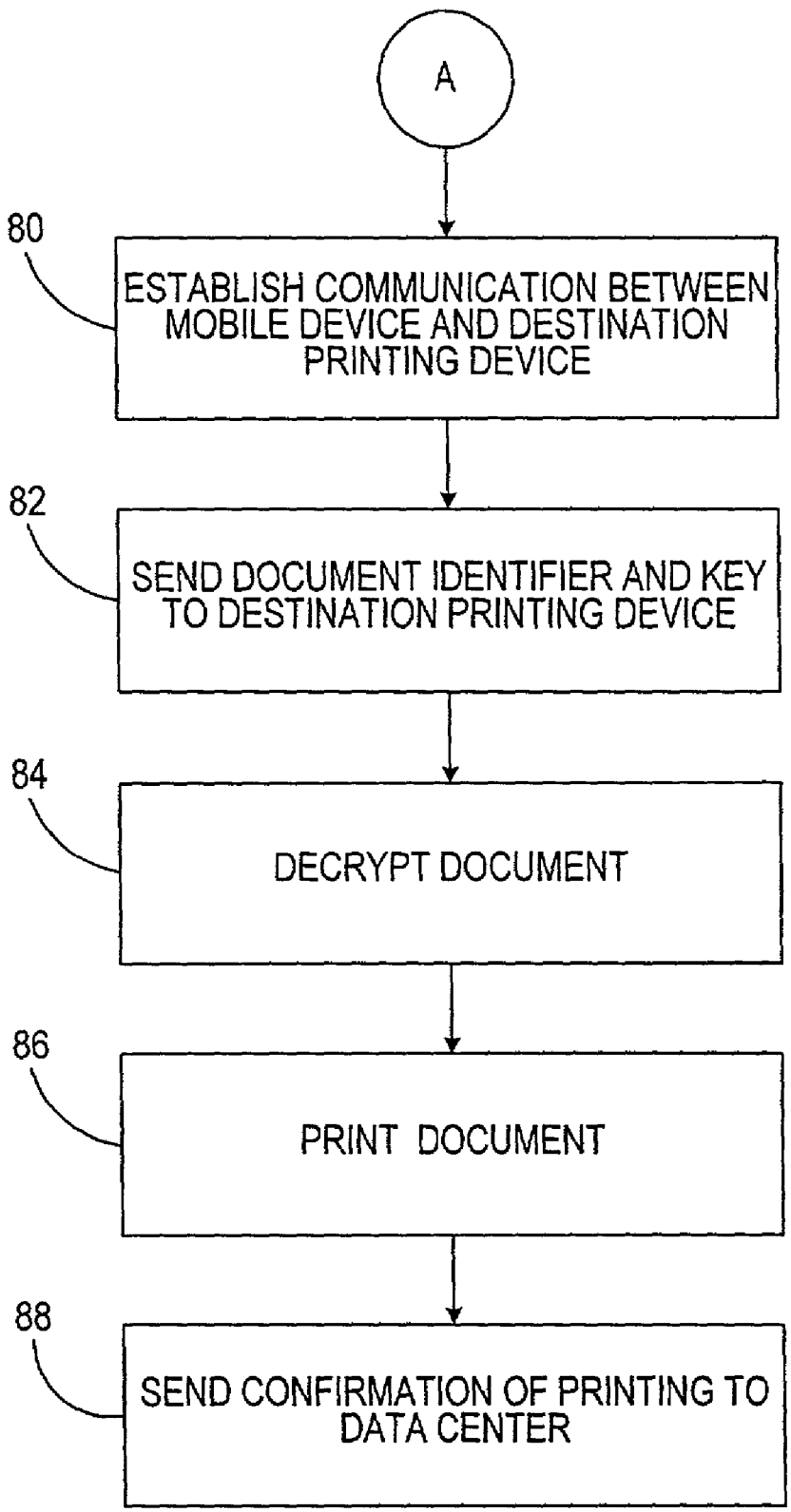

FIGS. 2A and 2B illustrate in flow diagram form a process flow of the messaging system 10 according to one embodiment of the present invention. In step 50, one or more documents 14 are maintained in data center 12. When a user desires to print a document or group of documents, in step 52 it is determined if information, such as, for example, the address or telephone number, of the destination printing device 22 is known. If this information is not known, then in step 54 a communication is established between mobile device 20 and destination printing device 22, and in step 56 the information is sent from the printing device 22 to the mobile device 20. Once this information has been received in step 56 or if in step 52 the information is known, then in step 58 a communication is established between the mobile device 20 and data center 12. In step 60, the destination printing device 22 information is sent to the data center 12, or, if the destination printing device information is already stored in data center 12, the desired destination printing device 22 is selected. In step 62, a document 14 or group of documents are selected for printing via the communication between the mobile device 20 and data center 12. In step 64, the selected document(s) 14 are encrypted and a key is created by data center 12. In step 66, the encrypted document(s) are sent to the destination printing device 22, using the information obtained in step 60, and stored in destination printing device 22. In step 68 the key created by data center 12 is sent to the mobile device 20.

Referring now to FIG. 2B, in step 80 a communication is established (if not previously established or re-established if the previous communication has been disrupted) between the mobile device 20 and destination printing device 22. In step 82, the document(s) 14 identifier and key are sent from the mobile device 20 to the destination printing device 22. In step 84, the printing device 22, using the document identifier and associated key, decrypts the document(s) 14 and in step 86 prints the decrypted document(s) 14. Optionally, in step 88, the printing device 22 can send confirmation of completion of printing of document(s) 14 to data center 12, mobile device 20, any one of the mobile devices associated with the user, or any combination of the above.

In accordance with another embodiment of the present invention, mobile device 20 will log into the data center 12 via communication link 24 and the user selects a document 14 or group of documents he desires to have printed. Data center 12 will encrypt the document(s) 14 and create a key for decrypting the document(s) 14. The encrypted document (s) 14 are then sent from data center 12 to the mobile device 20 along with the associated key. When the user is present at printing device 22, communication link 26 is established between mobile device 20 and printing device 22. Communication link 26 can either be initiated by the user via mobile device 20 or be initiated spontaneously when mobile device 20 and printing device 22 are within a certain range of each other. Mobile device 20 sends the encrypted document(s) 14 and the associated key created by data center 12 to printing device 22 via communication link 26. Printing device 22, upon receipt of the document(s) 14 and associated key, will decrypt the document(s) 14 using the associated key and print the decrypted document(s) 14 similarly as described above.

The operation of this embodiment is illustrated in the process flow diagram of FIG. 3. In step 50, one or more documents 14 are maintained in data center 12. When a user desires to print a document or group of documents, in step 100 a communication is established between the mobile device 20 and data center 12. In step 102, a document 14 or group of documents are selected for printing via the communication link 24 between the mobile device 20 and data center 12. In step 104, the selected document(s) 14 are encrypted and a key is created by data center 12. In step 106, the encrypted document(s) and key are sent to the mobile device 20. In step 108 a communication link 26 is established between the mobile device 20 and a destination printing device 22. In step 110, the encrypted document(s) 14 and key are sent from the mobile device 20 to the destination printing device 22. In step 112, the printing device 22, using the key, decrypts the document(s) 14 and in step 114 prints the decrypted document(s) 14. Optionally, in step 116, the printing device 22 can send confirmation of completion of printing of document(s) 14 to data center 12, mobile device 20, any one of the mobile devices associated with the user, or any combination of the above.

In accordance with another embodiment of the present invention, if the printing device 22 is a networked device along with data center 12, then instead of sending a document(s) 14 identifier to mobile device 20, a pointer can be provided from data center 12 to mobile device 20 that points to the location of the document(s) 14 in the network. The pointer would then be provided from the mobile device to the printing device 22 along with the key used to encrypt the document(s) 14. Alternatively, the pointer and key could be manually input by the user to printing device 22. Alternatively, data center 12 could provide the pointer directly to the printing device 22. Printing device 22 would retrieve the document(s) 14 from the location in the network specified by the pointer and use the key to decrypt the document(s) 14 for printing. Thus, for example, if printing device 22 is a shared network printer, the document(s) 14 will not actually be printed until the user's mobile device 20 has established contact with the printing device 22.

Figure 4A:
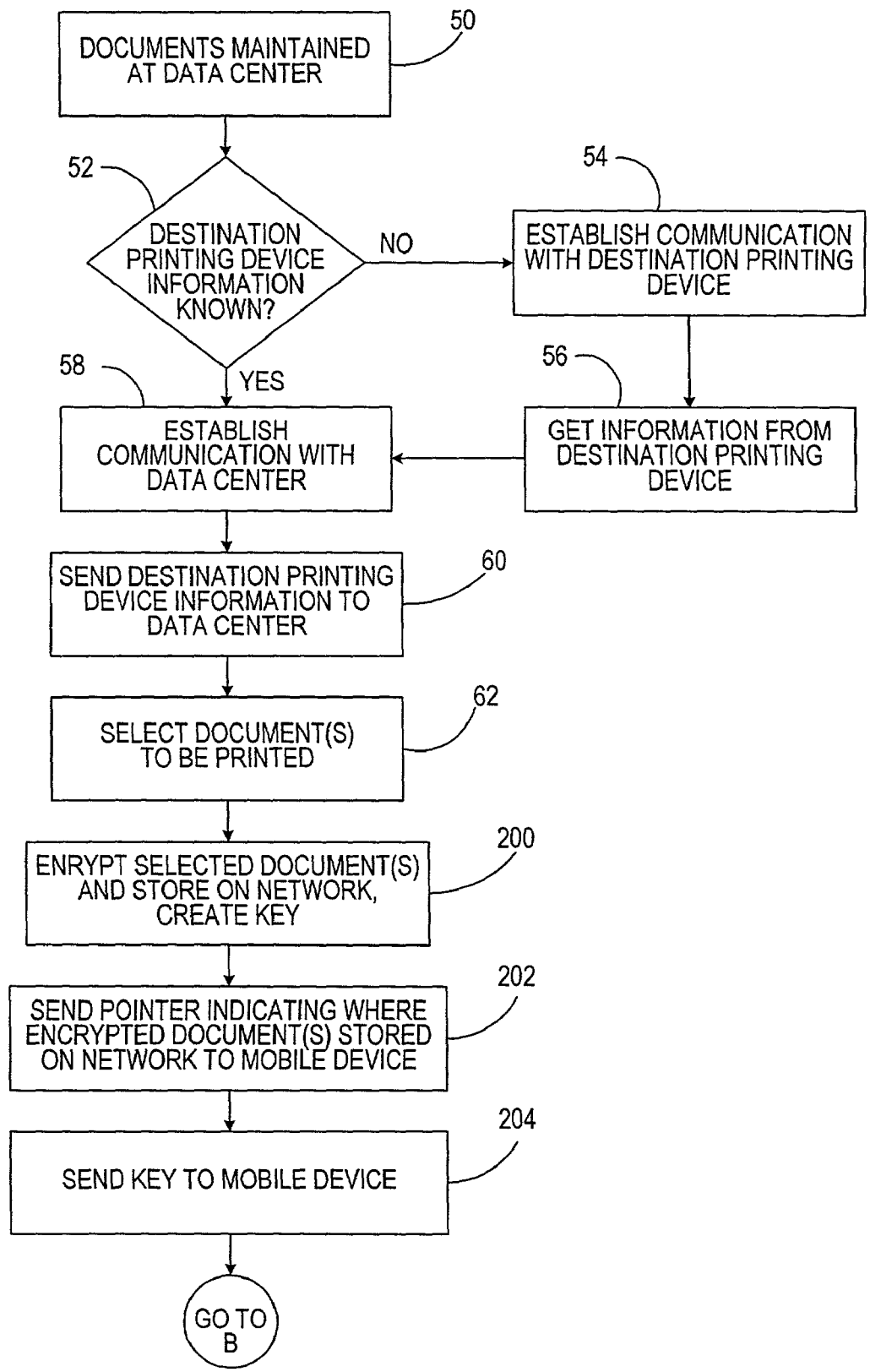
FIGS. 4A and 4B illustrate in flow diagram form a process flow of the messaging system according to another embodiment of the present invention.
Figure 4B:
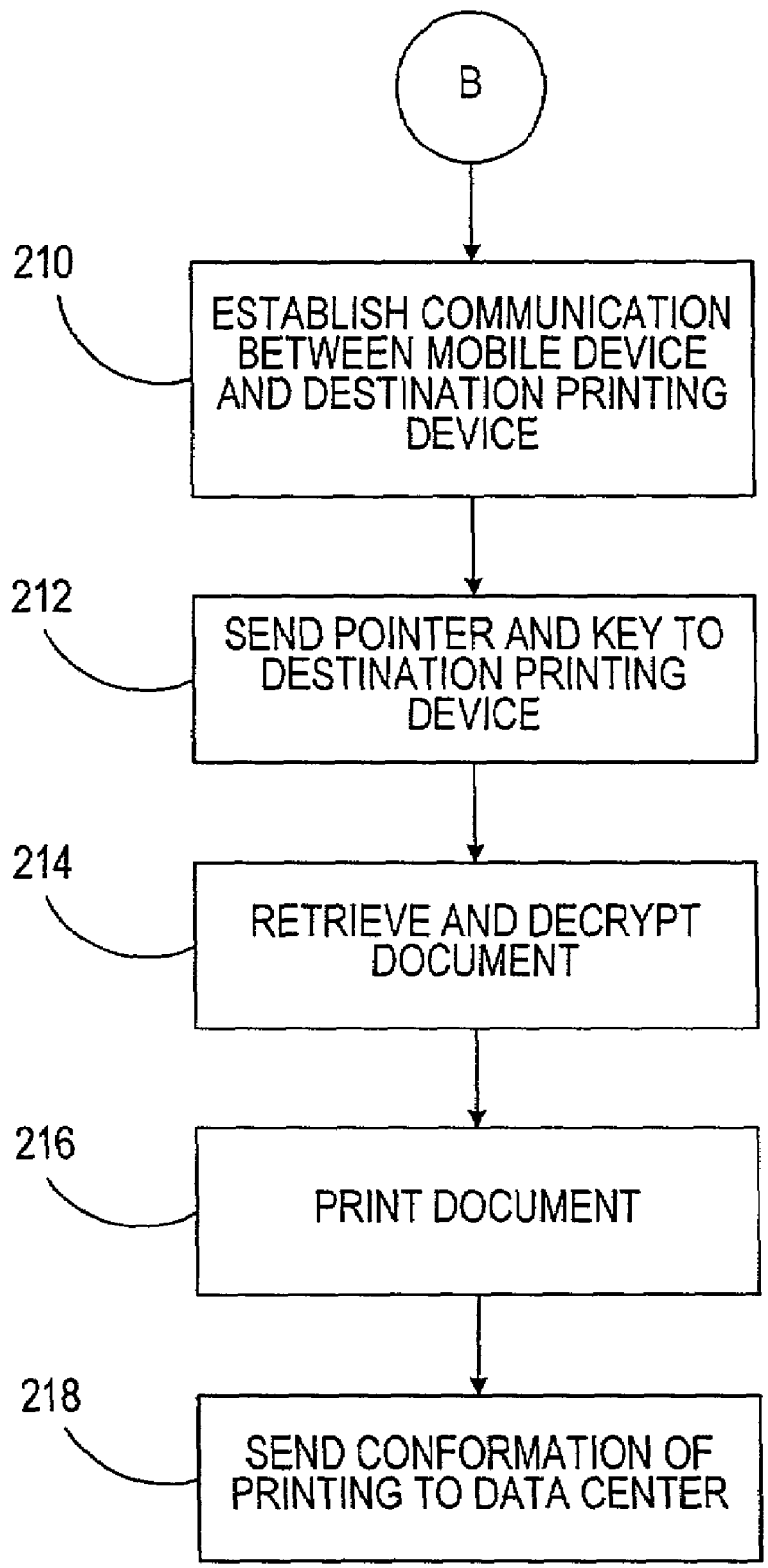

FIGS. 4A and 4B illustrate in flow diagram form a process flow of the messaging system 10 in which the destination printing device 22 is a networked device with data center 12. In step 50, one or more documents 14 are maintained in data center 12. When a user desires to print a document or group of documents, in step 52 it is determined if information, such as, for example, the address of the destination printing device 22 in the network, is known. If this information is not known, then in step 54 a communication is established between mobile device 20 and destination printing device 22, and in step 56 the information is sent from the printing device 22 to the mobile device 20. Once this information has been received in step 56 or if in step 52 the information is known, then in step 58 a communication is established between the mobile device 20 and data center 12. In step 60, the destination printing device 22 information is sent to the data center 12 or, if the destination printing device information is already stored in data center 12, the desired destination printing device 22 is selected. In step 62, a document 14 or group of documents are selected for printing via the communication between the mobile device 20 and data center 12, or alternatively, selection of the document(s) 14 can be done by any device coupled to the network. In step 200, the selected document(s) 14 are encrypted and stored on the network and a key is created by data center 12. In step 202, a pointer indicating where the encrypted document(s) 14 are stored on the network is sent to the mobile device 20. Alternatively, the pointer could be sent directly to the destination printing device 22 along with a document identifier, using the information obtained in step 60. In step 204 the key created by data center 12 is sent to the mobile device 20.

Referring now to FIG. 4B, in step 210 a communication is established (if not previously established or re-established if the previous communication has been disrupted) between the mobile device 20 and destination printing device 22. In step 212, the pointer indicating where the encrypted document(s) 14 are stored on the network and key are sent from the mobile device 20 to the destination printing device 22 or input to the destination device 22. Alternatively, if the pointer was sent directly to the destination printing device 22, the key and document identifier which identifies the pointer are sent from the mobile device 20 to the destination printing device 22. In step 214, the printing device 22, using the pointer, retrieves the encrypted document(s) 14 from the network and decrypts the document(s) 14 using the associated key. In step 216, the printing device 22 prints the decrypted document(s) 14. Optionally, in step 218, the printing device 22 can send confirmation of completion of printing of document(s) 14 to data center 12, mobile device 20, any one of the mobile devices associated with the user, or any combination of the above.

Thus, according to the present invention, secure, on-demand printing of documents to a facsimile machine or networked printing device is provided, thereby ensuring receipt of the documents only by the intended recipient to maintain confidentiality of the document.

It should be noted that the order of the steps described in the above embodiments need not be as stated. For example, the selection of the documents to be printed could be performed before the destination printing device is selected and identified.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for remotely retrieving a document comprising the steps of:
   storing said document in a data center;
   determining a destination device for said document, said destination device having associated identifying information;
   encrypting said document;
   sending an associated key to decrypt said encrypted document from said data center to a mobile device;
   sending said encrypted document from said data center to said destination device based on said identifying information;
   sending said associated key from said mobile device to said destination device; and
   decrypting said document using said associated key to retrieve said document at said destination device.

2. The method according to claim 1, further comprising:
   printing said retrieved document at said destination device.

3. The method according to claim 2, further comprising:
   sending a confirmation of said printing to at least one of said mobile device and said data center.

4. The method according to claim 1, wherein said storing further comprises storing a plurality of documents in said data center, and said method further comprises:
   selecting at least one of said plurality of documents for retrieval utilizing said mobile device.

5. The method according to claim 1, wherein said step of sending said encrypted document to said destination device further comprises:
   storing said encrypted document in said destination device.

6. The method according to claim 5, wherein if said associated key is not sent to said destination device within a predetermined period of time after receipt of said encrypted document, said method further comprises:
   deleting said encrypted document from said destination device.

7. The method according to claim 1, wherein said step of determining further comprises:
   establishing a communication between said mobile device and said destination device;
   sending said identifying information from said destination device to said mobile device; and
   sending said identifying information from said mobile device to said data center.

8. The method according to claim 7, wherein said communication is a wireless communication.

9. The method according to claim 8, wherein said wireless communication is an infrared communication.

10. The method according to claim 8, wherein said wireless communication is a radio frequency communication.

11. The method according to claim 10, wherein said radio frequency communication is established automatically.

12. The method according to claim 1, wherein said step of determining further comprises:
   manually inputting said identifying information into said mobile device; and
   sending said identifying information from said mobile device to said data center.

13. The method according to claim 1, wherein said step of sending said associated key from said mobile device to said destination device further comprises:
   sending said associated key from said mobile device to said destination device via a wireless communication.

14. The method according to claim 13, wherein said wireless communication is an infrared communication.

15. The method according to claim 13, wherein said wireless communication is a radio frequency communication.

16. The method according to claim 15, wherein said radio frequency communication is established automatically.

17. The method according to claim 1, wherein said step of sending said associated key from said mobile device to said destination device further comprises:
   manually inputting said associated key to said destination device.

18. The method according to claim 1, wherein said step of encrypting said document further comprises:
   providing an associated identifier for said encrypted document, said associated identifier being sent to said mobile device with said key and to said destination device with said encrypted document,
   said step of sending said associated key further comprising:
   sending said associated identifier along with said associated key from said mobile device to said destination device,
   wherein said destination device uses said associated identifier to identify said encrypted document to decrypt using said associated key.

19. The method according to claim 1, wherein said mobile device is a personal data assistant.

20. The method according to claim 1, wherein said mobile device is a cell phone.

21. The method according to claim 1, wherein said mobile device is a pager.

22. The method according to claim 1, wherein said mobile device is a laptop computer.

23. The method according to claim 1, wherein said destination device is a facsimile machine.

24. The method according to claim 23, wherein said associated identifying information includes a telephone number of said facsimile machine.

25. A method for printing a document using a facsimile machine comprising the steps of:
   establishing a wireless communication between a mobile device and said facsimile machine;
   sending facsimile machine identifying information from said facsimile machine to said mobile device;
   remotely selecting a document for printing from a data center using said mobile device;
   sending said facsimile machine identifying information from said mobile device to said data center;
   encrypting said selected document;
   sending said encrypted document to said facsimile machine based on said facsimile machine identifying information and sending a key to decrypt said encrypted document to said mobile device;
   sending said key from said mobile device to said facsimile machine via a wireless communication when said mobile device is physically located near said facsimile machine;
   decrypting, at said facsimile machine, said encrypted document sent to said facsimile machine using said key sent to said facsimile machine from said mobile device; and
   printing said decrypted document.

26. The method according to claim 25, wherein said facsimile machine identifying information includes a telephone number for said facsimile machine.

27. The method according to claim 25, wherein said step of encrypting said selected document further comprises:
   providing an associated identifier for said encrypted document, said associated identifier being sent to said mobile device with said key and to said facsimile machine with said encrypted document,
   said step of sending said key further comprising:
   sending said associated identifier along with said key from said mobile device to said facsimile machine,
   wherein said facsimile machine uses said associated identifier to identify said encrypted document to decrypt using said key.

28. The method according to claim 25, wherein said mobile device is a personal data assistant.

29. A system for remotely retrieving a document at a destination device, said system comprising:
   a data center to store said document, said data center encrypting said document before sending said document to said destination device;
   a mobile device to communicate wirelessly with said data center to provide information about said destination device; and
   a key created by said data center when said document is encrypted, said key being used to decrypt said document, said key being sent from said data center to said mobile device,
   wherein said data center sends said encrypted document to said destination device based on said information provided from said mobile device, said mobile device sends said key to said destination device, and said destination device decrypts said document using said key.

30. The system according to claim 29, wherein said mobile device is a personal data assistant.

31. The system according to claim 29, wherein said mobile device is a pager.

32. The system according to claim 29, wherein said mobile device is a cell phone.

33. The system according to claim 29, wherein said mobile device is a laptop computer.

34. The system according to claim 29, wherein said mobile device and said destination device communicate via a wireless communication.

35. The system according to claim 34, wherein said wireless communication is an infrared communication.

36. The system according to claim 34, wherein said wireless communication is a radio frequency communication.

37. The system according to claim 36, wherein said radio frequency communication is established automatically.

38. The system according to claim 34, wherein said wireless communication is a manual communication.

39. The system according to claim 29, wherein said destination device is a facsimile machine.

40. The system according to claim 39, wherein said information about said destination device includes a telephone number of said facsimile machine.

41. The system according to claim 29, further comprising:
a document identifier, said document identifier being sent to said destination device with said encrypted document and to said mobile device with said key,
wherein said mobile device sends said key and said document identifier to said destination device and said destination device uses said document identifier to identify said encrypted document to be decrypted with said key.

42. The system according to claim 29, wherein said destination device prints said decrypted document.

43. A system for remotely retrieving and printing a document comprising:
a data center to store said document;
a facsimile machine to print said document;
a mobile device to communicate wirelessly with said data center to provide information about said facsimile machine; and
a key created by said data center when said data center encrypts said document, said key being used to decrypt said document, said key being sent from said data center to said mobile device,
wherein said data center sends said encrypted document to said facsimile machine based on said information provided from said mobile device, said mobile device sends said key to said facsimile machine via a wireless communication, and said facsimile machine device decrypts said document using said key and prints said document.

44. The system according to claim 43, wherein said mobile device is a personal data assistant.

45. The system according to claim 43, wherein said mobile device is a pager.

46. The system according to claim 43, wherein said mobile device is a cell phone.

47. The system according to claim 43, wherein said mobile device is a laptop computer.

48. The system according to claim 43, wherein said mobile device and said facsimile machine device communicate via a wireless communication.

49. The system according to claim 48, wherein said wireless communication is an infrared communication.

50. The system according to claim 48, wherein said wireless communication is a radio frequency communication.

51. The system according to claim 50, wherein said radio frequency communication is established automatically.

52. The system according to claim 48, wherein said wireless communication is a manual communication.

53. The system according to claim 43, further comprising:
a document identifier, said document identifier being sent to said facsimile machine with said encrypted document and to said mobile device with said key,
wherein said mobile device sends said key and said document identifier to said facsimile machine and said facsimile machine uses said document identifier to identify said encrypted document to be decrypted with said key.

54. The system according to claim 43, wherein said information about said facsimile machine includes a telephone number of said facsimile machine.

* * * * *